United States Patent
Cha et al.

(10) Patent No.: US 10,591,683 B2
(45) Date of Patent: Mar. 17, 2020

(54) PASSIVE OPTICAL NETWORK-BASED VIDEO OVERLAY PLUGGABLE TYPE OPTICAL NETWORK DEVICE

(71) Applicant: LIGHTRON FIBER-OPTIC DEVICES INC., Daejeon (KR)

(72) Inventors: Hyun-Won Cha, Sejong-si (KR); Keun-Jae Park, Sejong-si (KR); Jeong-Hwan Cho, Sejong-si (KR); Oh-Sang Kwon, Sejong-si (KR); Hyun-Jong Youm, Sejong-si (KR); Seong-Seok Seo, Daejeon (KR); Young-Un Heo, Sejong-si (KR)

(73) Assignee: LIGHTRON FIGER-OPTIC DEVICES INC., Daejeon (KR)

( * ) Notice: Subject to any disclaimer, the term of this patent is extended or adjusted under 35 U.S.C. 154(b) by 0 days.

(21) Appl. No.: 16/197,044

(22) Filed: Nov. 20, 2018

(65) Prior Publication Data
US 2019/0324219 A1    Oct. 24, 2019

(30) Foreign Application Priority Data

Apr. 19, 2018  (KR) ................. 10-2018-0031581
Oct. 22, 2018  (KR) ................. 10-2018-0126054

(51) Int. Cl.
*G02B 6/38* (2006.01)
*G02B 6/42* (2006.01)

(52) U.S. Cl.
CPC .......... *G02B 6/3897* (2013.01); *G02B 6/387* (2013.01); *G02B 6/426* (2013.01); *G02B 6/428* (2013.01);

(Continued)

(58) Field of Classification Search
None
See application file for complete search history.

(56) References Cited

U.S. PATENT DOCUMENTS

| 2003/0147601 | A1* | 8/2003 | Bartur | G02B 6/4214 385/92 |
| 2006/0133742 | A1* | 6/2006 | Ruegg | G02B 6/4246 385/89 |

(Continued)

FOREIGN PATENT DOCUMENTS

KR    10-1348121 B1    1/2014

*Primary Examiner* — Tina M Wong
(74) *Attorney, Agent, or Firm* — Studebaker & Brackett PC (57) ABSTRACT

The present invention relates generally to a passive optical network (PON)-based video overlay pluggable type optical network device that is easily connected and detached from an indoor optical network terminal (ONT) at a subscriber side, which transmits and receives an optical signal in which a video RF optical signal and a PON optical signal are overlaid, wherein a PON board for receiving and processing the PON optical signals and a video RF board for receiving and processing the video RF optical signals are easily removed for replacement from a housing including an optical sub-assembly (OSA), which separates the PON optical signal and the video RF optical signal, and the PON board and the video RF board are individually designed and configured in a removable manner so that interference between the signals is minimized and selective combinations and production are possible according to various types of PONs and video services.

8 Claims, 7 Drawing Sheets

(52) U.S. Cl.
CPC ......... *G02B 6/4273* (2013.01); *G02B 6/4277* (2013.01); *G02B 6/4278* (2013.01); *G02B 6/4279* (2013.01)

(56) References Cited

U.S. PATENT DOCUMENTS

| | | | |
|---|---|---|---|
| 2008/0193135 A1* | 8/2008 | Du | G02B 6/29362 398/88 |
| 2009/0310920 A1* | 12/2009 | Kim | G02B 6/4214 385/88 |
| 2010/0135619 A1* | 6/2010 | Choi | G02B 6/12007 385/88 |
| 2012/0045187 A1* | 2/2012 | Khadar | G02B 6/4246 385/136 |
| 2013/0105672 A1* | 5/2013 | Chiu | G02B 6/4246 250/227.11 |
| 2016/0269115 A1* | 9/2016 | Brown | H04B 10/2504 |
| 2016/0269125 A1* | 9/2016 | Brown | G02B 6/3897 |
| 2017/0261707 A1* | 9/2017 | Onaka | G02B 6/4215 |
| 2019/0181954 A1* | 6/2019 | Kawase | G02B 6/42 |

\* cited by examiner

PASSIVE OPTICAL NETWORK-BASED VIDEO OVERLAY PLUGGABLE TYPE OPTICAL NETWORK DEVICE

CROSS REFERENCE TO RELATED APPLICATION

The present application claims priority to Korean Patent Application Nos. 10-2018-0031581, filed Apr. 19, 2018, and 10-2018-0126054, filed Oct. 22, 2018. The entire contents of which is incorporated herein for all purposes by this reference.

BACKGROUND

Field of the Invention

The present invention relates generally to a passive optical network-based video overlay pluggable type optical network device of an optical transmission network system in which passive optical network (PON) optical signals and video radio frequency (RF) optical signals are overlaid and are transmitted and received. More specifically, the present invention relates to a passive optical network-based video overlay pluggable type optical network device that is easily connected to and detached from an indoor optical network terminal (ONT) at a subscriber side, which transmits and receives an optical signal (hereinafter, referred to as "a video overlay optical signal") in which the video RF optical signal and the PON optical signal are overlaid, wherein a PON board for receiving and processing the PON optical signals and a video RF board for receiving and processing the video RF optical signals are easily removed for replacement from a housing including an optical sub-assembly (OSA), which separates the PON optical signal and the video RF optical signal from the video overlay optical signal, and the PON board and the video RF board are individually designed and configured in a removable manner so that unlike a general integrated board type, interference between the video RF signal and the PON signal is minimized and selective combinations and production are possible according to various types of PONs and video services.

Description of the Related Art

Generally, an optical transmission network system to which a video overlay technique is applied includes a passive optical network (PON)-based packet service and a radio frequency (RF)-based video service.

Accordingly, at the center of the area densely populated by residential subscribers to the optical transmission network system, a radio frequency video overlay optical network unit (ONU), which is a small outdoor/indoor optical communication device capable of simultaneously providing the PON service and the RF-based video service, is provided.

Examples of the conventional radio frequency video overlay optical network unit include a can type, a mold type, a soldered-in type, and the like.

Since examples of the conventional radio frequency video overlay optical network unit include the can, mold, soldered-in types, and the like, the volume is large. Therefore, a relatively large installation space is required to be attached on an indoor optical network terminal (ONT) board.

The radio frequency video overlay optical network unit is large in volume so that a wide inner space is secured. Because of this, separation between a PON board, connected by soldering, or the like, for processing the PON service and a RF board, connected by soldering, or the like, for processing the video RF service is relatively easy. As described above, the distance between the PON board and the RF board is obtained so that interference between a PON signal and an RF signal less occurs.

However, due to the large volume of the conventional radio frequency video overlay optical network unit, a wide installation space is required, which is difficult to be secured. The soldered-in and mold types cause difficulty in attaching and detaching the boards so that repair of a defect is not easy and replacement to other modules is also difficult.

Also, fundamental external interfaces and shapes of conventional radio frequency video overlay optical network units are similar for each manufacturer. As standardization of interface specifications is not established, for example, SFP or XFP, compatibility is poor.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention is intended to propose a passive optical network-based video overlay pluggable type optical network device that is easily connected and detached from an indoor optical network terminal (ONT) at a subscriber side, which transmits and receives an optical signal (hereinafter, referred to as "a video overlay optical signal") in which the video RF optical signal and the PON optical signal are overlaid, wherein a PON board for receiving and processing the PON optical signals and a video RF board for receiving and processing the video RF optical signals are easily removed for replacement from a housing including an optical sub-assembly (OSA), which separates the PON optical signal and the video RF optical signal from the video overlay optical signal, and the PON board and the video RF board are individually designed and configured in a removable manner so that unlike a general integrated board type, interference between the video RF signal and the PON signal is minimized and selective combinations and production are possible according to various types of PONs and video services.

In order to achieve the above object, according to one aspect of the present invention, there is provided a passive optical network (PON)-based video overlay pluggable type optical network device including: a triplexer optical sub-assembly having: an optical cable connector connected to an optical splitter; a first connector connected to a passive optical network processing unit; and a second connector connected to a video radio frequency processing unit, wherein when a detachable optical cable is inserted into the optical cable connector, the triplexer optical sub-assembly is connected to the optical splitter and receives a video overlay optical signal, separates a PON optical signal and an RF optical signal from the received video overlay optical signal and outputs the resulting PON optical signal through the first connector, outputs the resulting RF optical signal through the second connector, and transmits the PON optical signal input through the first connector to the optical splitter through the optical cable connector; an RF board, on which the video radio frequency processing unit is provided, having: a second connector connected to the second connector of the triplexer optical sub-assembly; and a third connector connected to the passive optical network processing unit, wherein an RF signal subjected to photoelectric conversion, which is input through the second connector of the RF board, is amplified by the video radio frequency processing unit and is output through the third connector, and the RF board is controlled by the passive optical network processing unit via the third connector; a PON board, on which the passive optical network processing unit is provided, having: a first connector connected to the first connector of the triplexer optical sub-assembly; a third connector connected to the third connector of the video radio frequency processing unit; and an optical network terminal (ONT) connector provided to be inserted and removed from an ONT, wherein the PON board transmits and receives the PON optical signal through the first connector of the triplexer optical sub-assembly, and is connected to the third connector of the RF board through the third connector of the PON board to receive the RF signal and to transmit a control signal, and the ONT connector transmits a PON signal and the RF signal to the ONT and receives the PON signal when being inserted into the ONT; and an electromagnetic wave shielding part provided between the RF board and the PON board and at an upper portion and a lower portion, the electromagnetic wave shielding part blocking interference between the RF signal and the PON signal and blocking electromagnetic waves from emission to outside.

The triplexer optical sub-assembly may include: an overlay optical transmission and reception unit provided with the optical cable connector to receive the video overlay optical signal and to transmit the PON optical signal; a PON optical transmission unit provided on a horizontal line with the overlay optical transmission and reception unit, the PON optical transmission unit receiving the PON optical signal to be transmitted through the first connector from the PON board; a PON optical reception unit provided to be perpendicular to the horizontal line, the PON optical reception unit outputting the PON optical signal included in the video overlay optical signal to the PON board through the first connector; an RF optical reception unit provided to be perpendicular to the horizontal line and to be in an opposite direction to the PON optical reception unit, the RF optical reception unit outputting the RF optical signal included in the video overlay optical signal; and an optical separation unit separating the PON optical signal from the video overlay optical signal received from the overlay optical transmission and reception unit and outputting the resulting PON optical signal to the PON optical reception unit, separating the RF optical signal from the video overlay optical signal and outputting the resulting RF optical signal to the RF optical reception unit in the opposite direction to the PON optical reception unit, and passing the PON optical signal input from the PON optical transmission unit to the overlay optical transmission and reception unit.

The PON board may be a board to which one among a gigabit Ethernet passive optical network (GE-PON), a gigabit passive optical network (G-PON), a 10 gigabit passive optical network (XG-PON), and a next-generation passive optical network (NG-PON) is applied, and the RF board may be a board to which one among DOCSIS 3.0, DOCSIS 3.1, EU-CATV, and US CATV is applied.

In the case of an XFP pluggable type, the ONT connector includes 30 pins, a sixth pin (Pin#6) is a power supply pin (VCC5), a 23-th pin (Pin#23) is an RF ground pin (RF_GND), a 24-th pin (Pin#24) is an RF output pin (RF_OUT), and a 25-th pin (Pin#25) is an RF ground pin (RF_GND).

The electromagnetic wave shielding part may include: a first electromagnetic wave absorption pad provided between a lower housing and the RF board to absorb electromagnetic waves; a second electromagnetic wave absorption pad provided between the RF board and the PON board to absorb electromagnetic waves; and a third electromagnetic wave absorption pad provided between the PON board and a bottom part of an upper housing to absorb electromagnetic waves.

The electromagnetic wave shielding part may further include: a first heat radiation pad provided between the RF board and the first electromagnetic wave absorption pad to radiate heat generated from the RF board; a second heat radiation pad provided between the second electromagnetic wave absorption pad and the PON board to radiate heat generated from the RF board and the PON board; and a third heat radiation pad provided between the PON board and the third electromagnetic wave absorption pad to radiate heat generated from the PON board.

The third connector of the PON board and the third connector of the RF board, which are provided at upper portions of the respective boards, may be directly connected to each other, and the second electromagnetic wave absorption pad and the second heat radiation pad may be provided with connection holes corresponding to shapes of the third connectors at portions corresponding to the third connectors.

According to the present invention, attaching and detaching is easier than the soldered-in type, so that convenient product upgrade, maintenance, and the like are supported and considerable costs are saved.

While minimizing the size of the optical network unit of the present invention, an electromagnetic wave shielding structure is applied internally between the PON board and the RF board to separate the PON board and the RF board. Therefore, signal interference between the PON signal of the PON board and the RF signal of the RF board is minimized.

Also, according to the present invention, the PON board and the RF board are provided in the form of a module which is detachable so that boards for the various existing PON services and video services each are produced and the PON board and the RF board of the optical network device are replaced by another type of the PON board and another type of the RF board, whereby various PON services and video services are provided via a single optical network device.

Also, according to the present invention, based on a standard interface, a new interface dedicated to RF is applied so that compatibility between various systems is possible.

Also, since the present invention adopts a low power design technique of a small form factor module, power loss is minimized.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, a passive optical network-based video overlay optical transmission network system to which the present invention is applied and configuration and operation of a pluggable type optical network device according to the present invention will be described in detail with reference to the accompanying drawings.

Figure 1:
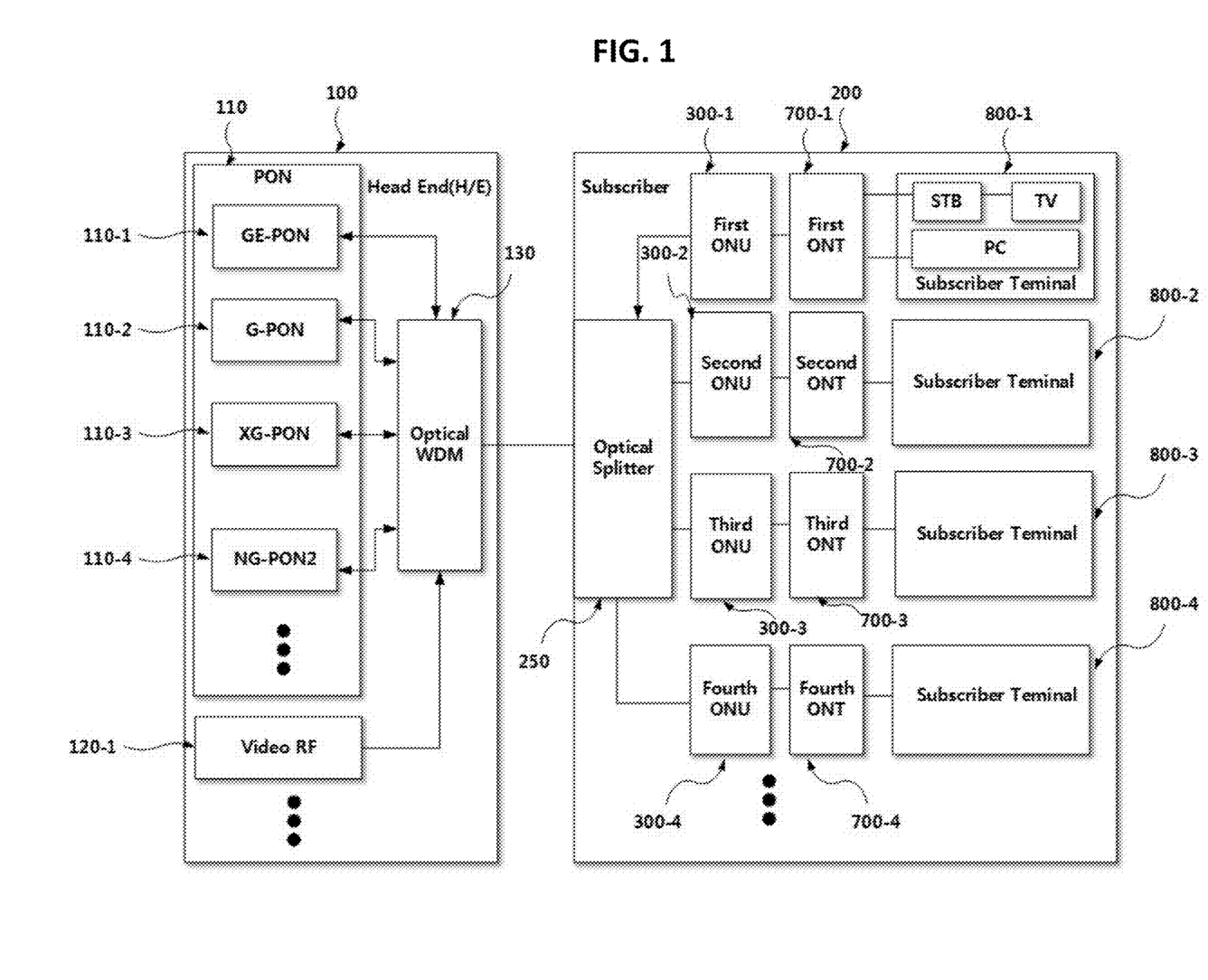
FIG. 1 is a diagram illustrating configuration of a passive optical network-based video overlay optical transmission network system according to the present invention.

FIG. 1 is a diagram illustrating configuration of a passive optical network-based video overlay optical transmission network system according to the present invention.

The optical transmission network system according to the present invention includes a head end (H/E) 100 and a subscriber unit 200. The head end 100 is connected to the subscriber unit 200 via an optical communication cable.

The head end 100 includes a passive optical network system 110, a video RF network system 120, and an optical wavelength division multiplexing (optical WDM) unit 130. Examples of the passive optical network system 110 include 10 Gbps NG-PON2, 10 Gbps XG-PON, 2.5 Gbps G-PON, 1 Gbps GE-PON, and the like. Examples of the video RF network system 120 include cable television (CATV) of various countries, and the like.

The optical wavelength division multiplexing unit 130 performs optical wavelength division multiplexing on PON optical signals output from various multiple passive optical network systems 110 and on RF optical signals output from various video radio frequency (Video RF) network systems 120 with respect to multiple subscribers, into video overlay optical signals and transmits the results to the subscriber unit 200 via an optical cable which is a single optical fiber.

According to the present invention, the subscriber unit 200 includes: an optical splitter 250; multiple optical network units (ONUs) 300; multiple optical network terminals (ONTs) 700; and multiple subscriber terminals 800.

The optical splitter 250 receives the video overlay optical signals subjected to optical wavelength division multiplexing with respect to the multiple subscribers from the head end 100 via the optical cable, and then distributes the video overlay optical signals among subscribers for transmission to the corresponding optical network units 300.

The optical splitter 250 may include an optical WDM unit that performs optical wavelength division multiplexing on the PON optical signals from the optical network units 300 and transmits the results to the head end 100.

The optical network units 300 receive the video overlay optical signals via the optical cable, performs photoelectric conversion by separating the PON optical signals and the RF optical signals, output the PON signals and RF signals subjected to photoelectric conversion to the corresponding ONTs 700, and receives the PON signal from an arbitrary one of the ONTs 700 for photoelectric conversion and then transmits the result to the optical splitter 250 via the optical cable.

The ONTs 700 output the PON optical signals and the RF optical signals received from the optical network units 300 to the subscriber terminals 800 and transmit the PON signals including at least one among control signals and data received from the subscriber terminals 800 to the optical network units 300.

Figure 2:
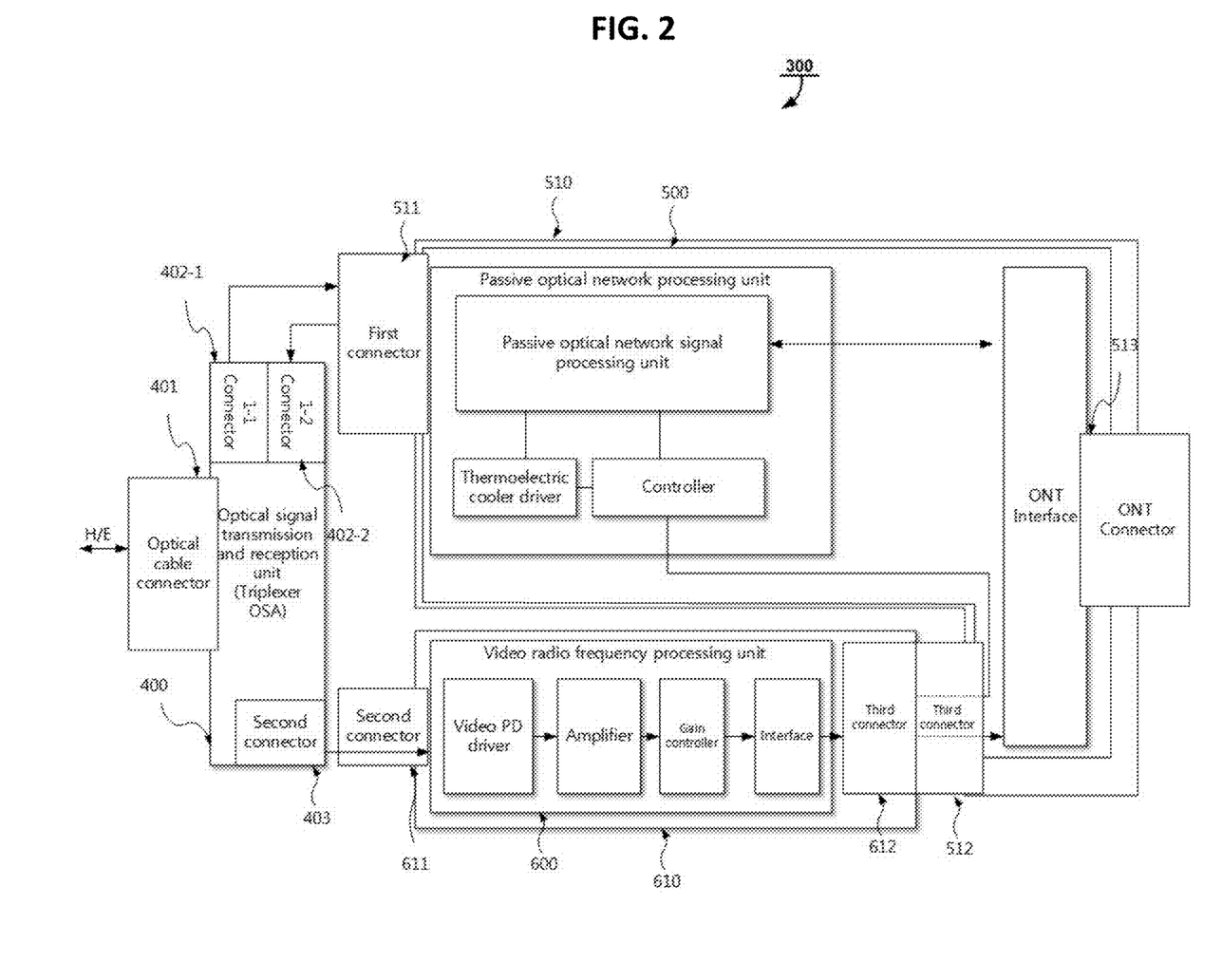
FIG. 2 is a block diagram illustrating a passive optical network-based video overlay pluggable type optical network device according to the present invention.

FIG. 2 is a block diagram illustrating a passive optical network-based video overlay pluggable type optical network device according to the present invention;

Referring now to FIG. 2, according to the present invention, each passive optical network-based video overlay pluggable type optical network device 300, which is also called a passive optical network-based video overlay pluggable type optical network unit, includes: an optical signal transmission and reception unit 400; a passive optical network processing unit 500; and a video radio frequency processing unit 600.

The passive optical network processing unit 500 is provided on a printed circuit board (PCB) (hereinafter, referred to as "a PON board") 510 which is physical according to electronic configuration.

Also, the video radio frequency processing unit 600 is provided on a PCB (hereinafter, referred to as "an RF board") 610 which is a physical thing according to electronic configuration.

As described above, it is noted that the passive optical network processing unit 500 and the PON board 510 have the same configuration as the video radio frequency processing unit 600 and the RF board 610, but different names and reference numerals are used to distinguish between the electronic configuration and the physical configuration.

For the PON board, one among a gigabit Ethernet passive optical network (GE-PON), a gigabit passive optical network (G-PON), a 10 gigabit passive optical network (XG-PON), a next-generation passive optical network (NG-PON), and other passive optical network (PON) may be applied. For the RF board, one among DOCSIS 3.0, DOCSIS 3.1, EU-CATV, US CATV, and other video RF services may be applied.

The optical signal transmission and reception unit 400, which includes an optical cable connector 401, a first connector 402, and a second connector 403, is connected to the optical splitter 250 via the optical cable connected to the optical cable connector 401, is connected to the passive optical network processing unit 500 through the first connector 402, and is connected to the video radio frequency processing unit 600 through the second connector. The first connector 402 includes a 1-1 connector 402-1 and a 1-2 connector 402-2.

The optical signal transmission and reception unit 400, which is generally referred to as a triplexer optical subassembly (triplexer OSA), receives the video overlay optical signal in which the PON optical signal and the RF optical signal are overlaid from the optical splitter 250 through the optical cable connector 401 and separates the PON optical signal and the RF optical signal, and then outputs the resulting PON optical signal to the passive optical network processing unit 500 through the first connector 402, outputs the resulting RF optical signal to the video radio frequency processing unit 600 through the second connector 403, and transmits the PON optical signal received from the passive optical network processing unit 500 through the first connector 402 to the optical splitter 250 through the optical cable connector 401.

The video radio frequency processing unit 600, which is provided on the RF board 610, includes a second connector 611 connected to the second connector 403 of the optical signal transmission and reception unit 400 and a third connector 612 connected to a third connector 512 of the passive optical network processing unit 500. When the resulting RF optical signal is received from the optical signal transmission and reception unit 400 through the second connector 611, the video radio frequency processing unit 600 performs photoelectric conversion and outputs the result to the passive optical network processing unit 500 through a third connector 612.

Also, the video radio frequency processing unit 600 performs communication with the passive optical network processing unit 500 via the third connector 612.

The passive optical network processing unit 500, which is provided on the PON board 510 in the form of a module, includes: a first connector 511 connected to the first connector 402 of the optical signal transmission and reception unit 400; the third connector 512 connected to the video radio frequency processing unit 600; and an ONT connector 513 connected to the ONT 700. Furthermore, the passive optical network processing unit 500 performs photoelectric conversion on the PON optical signal received from the optical signal transmission and reception unit 400 and on the RF optical signal received from the video radio frequency processing unit 600 each to obtain the PON signal and the RF signal, and transmits the resulting signals to the ONT 700 through the ONT connector 513. Also, the passive optical network processing unit 500 performs photoelectric conversion on the PON signal received from the ONT 700 and outputs the result to the optical signal transmission and reception unit 400 through the first connector 511.

The ONT connector 513 uses a multi-source agreement (MSA) standard as shown in Table 1 below which shows an example of an XFP pluggable type and sets new standard interface specifications with respect to a couple of pins as shown in Table below which shows an example of the XFP pluggable type for video RF according to the present invention. In the case of the XFP pluggable type, the changes are summarized in Table 3.

TABLE 1

| # | Symbol | Description | Remarks |
|---|---|---|---|
| 1 | GND | Module Ground | |
| 2 | Tx_Fault | Module TX Fault | Active High |
| 3 | NC | No Connect | |
| 4 | Tx_SD | Signal Detection when Laser is on | Active High |
| 5 | Tx disable | Transmitter Disable | Active High |
| 6 | NC | No Connect | |
| 7 | GND | Module Ground | |
| 8 | VCC3 | +3.3 V Power Supply | |
| 9 | VCC3 | +3.3 V Power Supply | |
| 10 | SCL | 2-Wire Serial Interface Clock | |
| 11 | SDA | 2-Wire Serial Interface Data Line | |
| 12 | Mod_ABS | MOD_Absent | Internally grounded in module |
| 13 | NC | No Connect | |
| 14 | RX_LOS | Receiver Loss of Signal Indicator | Active High |
| 15 | GND | Module Ground | |
| 16 | GND | Module Ground | |
| 17 | RD− | AC Coupled | |
| 18 | RD+ | AC Coupled | |

TABLE 1-continued

| # | Symbol | Description | Remarks |
|---|---|---|---|
| 19 | GND | Module Ground | |
| 20 | NC | No Connect | |
| 21 | MDO_DIS | Module disable(Power down) | Active Low |
| 22 | NC | No Connect | |
| 23 | GND | Module Ground | |
| 24 | NC | No Connect | |
| 25 | NC | No Connect | |
| 26 | GND | Module Ground | |
| 27 | GND | Module Ground | |
| 28 | TD− | AC Coupled | |
| 29 | TD+ | AC Coupled | |
| 30 | GND | Module Ground | |

TABLE 2

| # | Symbol | Description | Remarks |
|---|---|---|---|
| 1 | GND | Module Ground | |
| 2 | Tx_Fault | Module TX Fault | Active High |
| 3 | NC | No Connect | |
| 4 | Tx_SD | Signal Detection when Laser is on | Active High |
| 5 | Tx disable | Transmitter Disable | Active High |
| 6 | VCC5 | +5.0 V Power Supply | Optional |
| 7 | GND | Module Ground | |
| 8 | VCC3 | +3.3 V Power Supply | |
| 9 | VCC3 | +3.3 V Power Supply | |
| 10 | SCL | 2-Wire Serial Interface Clock | |
| 11 | SDA | 2-Wire Serial Interface Data Line | |
| 12 | Mod_ABS | MOD_Absent | Internally grounded in module |
| 13 | NC | No Connect | |
| 14 | RX_LOS | Receiver Loss of Signal Indicator | Active High |
| 15 | GND | Module Ground | |
| 16 | GND | Module Ground | |
| 17 | RD− | AC Coupled | |
| 18 | RD+ | AC Coupled | |
| 19 | GND | Module Ground | |
| 20 | NC | No Connect | |
| 21 | MDO_DIS | Module disable(Power down) | Active Low |
| 22 | NC | No Connect | |
| 23 | RF GND | Analog Ground | |
| 24 | RF Out | Analog RF Output | 50 ohm or 75 ohm selectable |
| 25 | RF GND | Analog Ground | |
| 26 | GND | Module Ground | |
| 27 | GND | Module Ground | |
| 28 | TD− | AC Coupled | |
| 29 | TD+ | AC Coupled | |
| 30 | GND | Module Ground | |

| New Interface (Designed for Triplexer) | Current Interface |
|---|---|
| Pin #6 (VCC5) ☐ | ☐ Pin #6 (NC) |
| Pin #23 (RF_GND) ☐ | ☐ Pin #23 (Module_GND) |
| Pin #24 (RF_OUT) ☐ | ☐ Pin #24 (NC) |
| Pin #25 (RF_GND) ☐ | ☐ Pin #25 (NC) |

Tables 1 to 3 show the case of the XFP pluggable type as an example, but other pluggable products may also be implemented by applying the same method as the XFP pluggable type.

In this way, while applying standards, by applying a minority-only new interface for video RF only to a couple of pins which are not used in the existing standard interface or are used as common grounds, the use thereof is possible by accessing the devices with the existing standards. Also, the use is possible with application to the ONT 700 according to the present invention and compatibility is excellent.

Also, the passive optical network processing unit 500 of the present invention performs communication with the video radio frequency processing unit 600 of the RF board 610 in consequence of addition of the RF board 610. In order to apply a new interface for controlling the radio frequency processing unit 600, in the case of the XFP pluggable type, a memory map that defines protocols according to the MSA standard is required to be modified as shown in Table 4 below.

Figure 3:
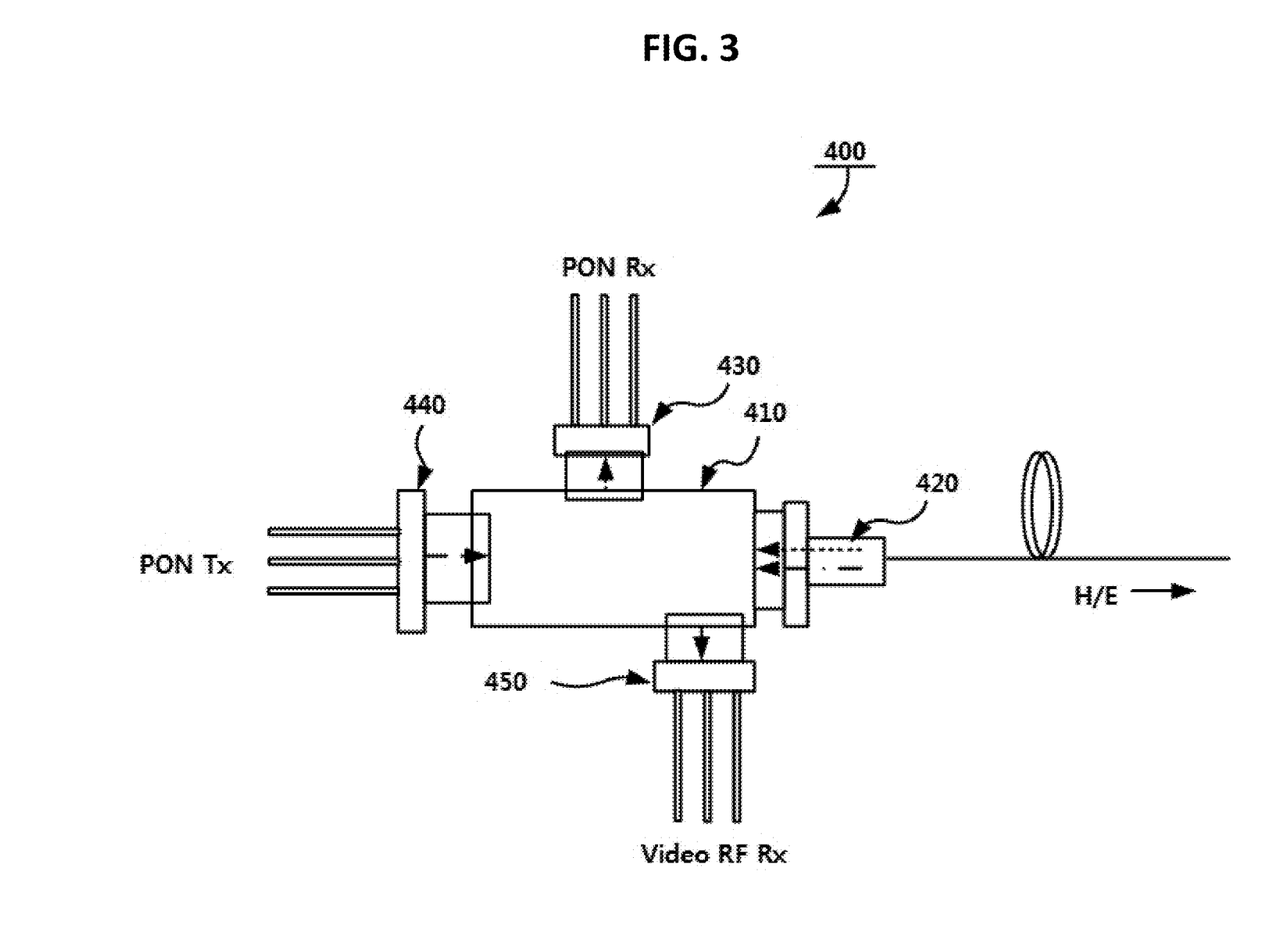
FIG. 3 is a diagram illustrating configuration of a triplexer optical sub-assembly (OSA) that is an optical signal transmission and reception unit of a passive optical network-based video overlay pluggable type optical network device according to the present invention.

The PON optical reception unit 430 and the RF optical reception unit 450 are provided in opposite directions which are perpendicular to the horizontal line with the optical separation unit 410 in between. In order to separate the video overlay optical signal into the PON optical signal and the RF optical signal, the PON optical reception unit 430 and the RF optical reception unit 450 are not provided on the same vertical line as shown in FIG. 3.

TABLE 4

| Data Address | Field Size | Name of Field | Hex | Description of Field |
|---|---|---|---|---|
| A0h_Lower Memory Map | | | | |
| October 11 | 2 | Analog RX Power High Alarm | 4D-F1 | 3 dBm |
| December 13 | 2 | Analog RX Power Low Alarm | 03-E8 | −10 dBm |
| 14-15 | 2 | Analog RX Power High Warning | 3D-E9 | 2 dBm |
| 16-17 | 2 | Analog RX Power Low Warning | 04-E8 | −9 dBm |
| 50-51 | 2 | AUX 2 High Alarm | 3.00E-8.0 | 16 dBmV |
| 52-53 | 2 | AUX 2 Low Alarm | 2A-F8 | 11 dBmV |
| 54-55 | 2 | AUX 2 High Warning | 3A-98 | 15 dBmV |
| 56-57 | 2 | AUX 2 Low Warning | 2E-E0 | 12 dBmV |
| 98-99 | 2 | RF Power Monitor | | Unit: 1 dBuV |
| 108-109 | 2 | AUX2 Video RX Power | | Video RX Power value in units defined in MSA |
| 111 | 1 | General Control | | 0b: RF Video Off, 1b: RF Video On |
| Table 01h_Serial ID Data Field | | | | |
| 129 | 1 | Ext. Identifier | 90 | 3.5 W. w/CDR, W/o Refclk, w/o CLEI |
| 130 | 1 | Connector | 1 | SC Connector |
| 168-183 | 16 | Vender PN(ASCII code) | — | XFPELT-RSAS-A |
| 194-195 | | | 46-00 | 600 mA@3.3 V 200 mA@5.0 V(Optional) |
| 222 | 1 | Aux Monitoring | 76 | Aux1 for 3.3 V supply Voltage Aux2 for 5.0 V supply voltage(optional) |
| Table 70h_RF Table Fields | | | | |
| 128 | 1 | Reserved | | Reserved |
| 129 | 1 | RF Channel | — | 1~136(default: 136) |
| 130-179 | 50 | Reserved | | Reserved |
| 131 | 1 | AGC OFFSET | — | 8 bit signed two's complement |
| 132-255 | 124 | Reserved | | Reserved |

As described above, in addition to the XFP pluggable type, other pluggable products may be implemented by applying the same memory map application method which is applied to the XFP pluggable type.

FIG. 3 is a diagram illustrating configuration of a triplexer optical sub-assembly (OSA) that is an optical signal transmission and reception unit of a passive optical network-based video overlay pluggable type optical network device according to the present invention.

More specifically, referring to FIG. 3, the triplexer optical sub-assembly 400, which is the optical signal transmission and reception unit, includes: an optical separation unit 410; an overlay optical transmission and reception unit 420; a PON optical transmission unit 440; a PON optical reception unit 430; and an RF optical reception unit 450, as shown in FIG. 3.

The optical separation unit 410, the overlay optical transmission and reception unit 420, and the PON optical transmission unit 440 are provided on the same horizontal line. The overlay optical transmission and reception unit 420 and the PON optical transmission unit 440 are provided in opposite directions with the optical separation unit 410 in between.

When the optical cable is connected to the optical cable connector 401, the overlay optical transmission and reception unit 420 of which the front is provided with the optical cable connector 401 is connected to the optical splitter 250, receives the video overlay optical signal, and transmits the PON optical signal to the optical splitter 250.

The optical separation unit 410 separates the video overlay optical signal input from the overlay optical transmission and reception unit 420 into the PON optical signal and the RF optical signal, and outputs the resulting PON optical signal through the PON optical reception unit 430 and the resulting RF optical signal through the RF optical reception unit 450.

The input and output terminals of the PON optical transmission unit 440 and the PON optical reception unit 430 are provided with the first connector 402. In FIG. 3, the PON optical transmission unit 440 is perpendicular to the PON optical reception unit 430. Therefore, the PON optical transmission unit 440 is provided with the 1-2 connector 402-2 and the PON optical reception unit 430 is provided with the 1-1 connector 402-1. That is, the first connector 402 is configured to include the 1-1 connector 402-1 and the 1-2 connector 402-2.

The RF optical reception unit 450 of which the output terminals are provided with the second connector 403 outputs the resulting RF optical signal obtained by the optical separation unit 410 to the video radio frequency processing unit 600, namely, the RF board 610 through the second connector 403 and the second connector 611.

Figure 4:
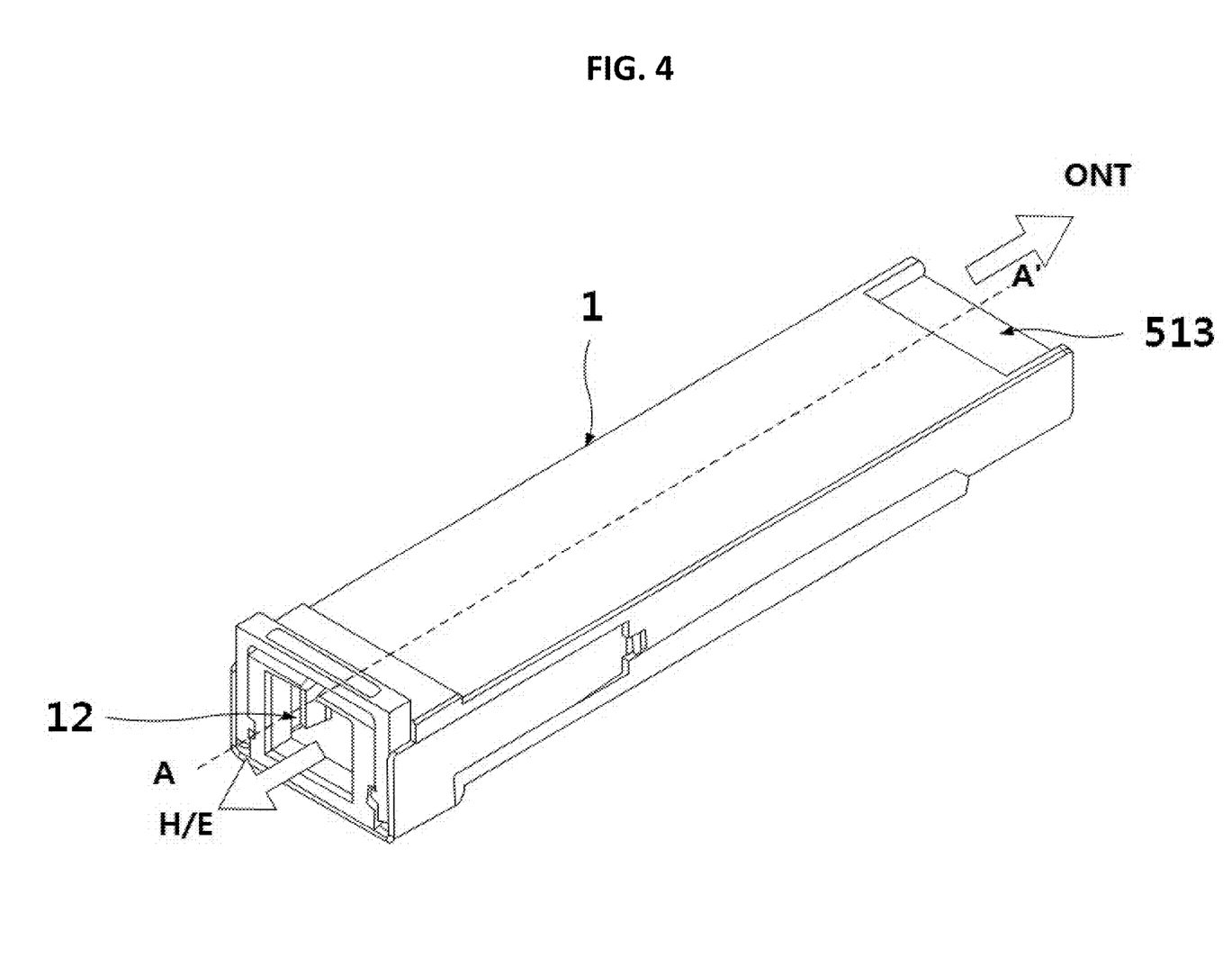
FIG. 4 is a perspective diagram illustrating a passive optical network-based video overlay pluggable type optical network device according to an embodiment of the present invention.
Figure 5:
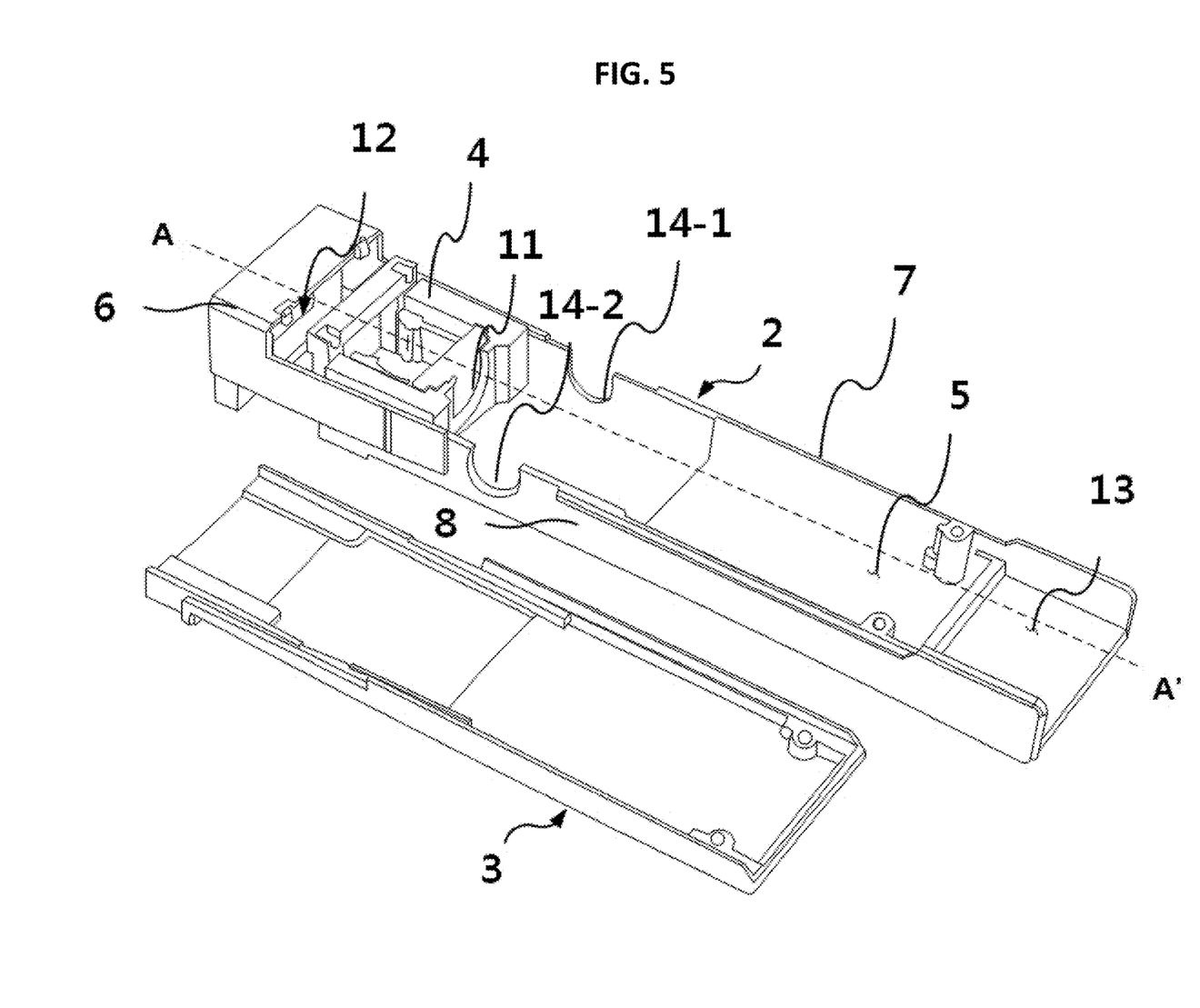
FIG. 5 is an exploded perspective diagram illustrating a lower housing and an upper housing of a passive optical network-based video overlay pluggable type optical network device according to an embodiment of the present invention.
Figure 6:
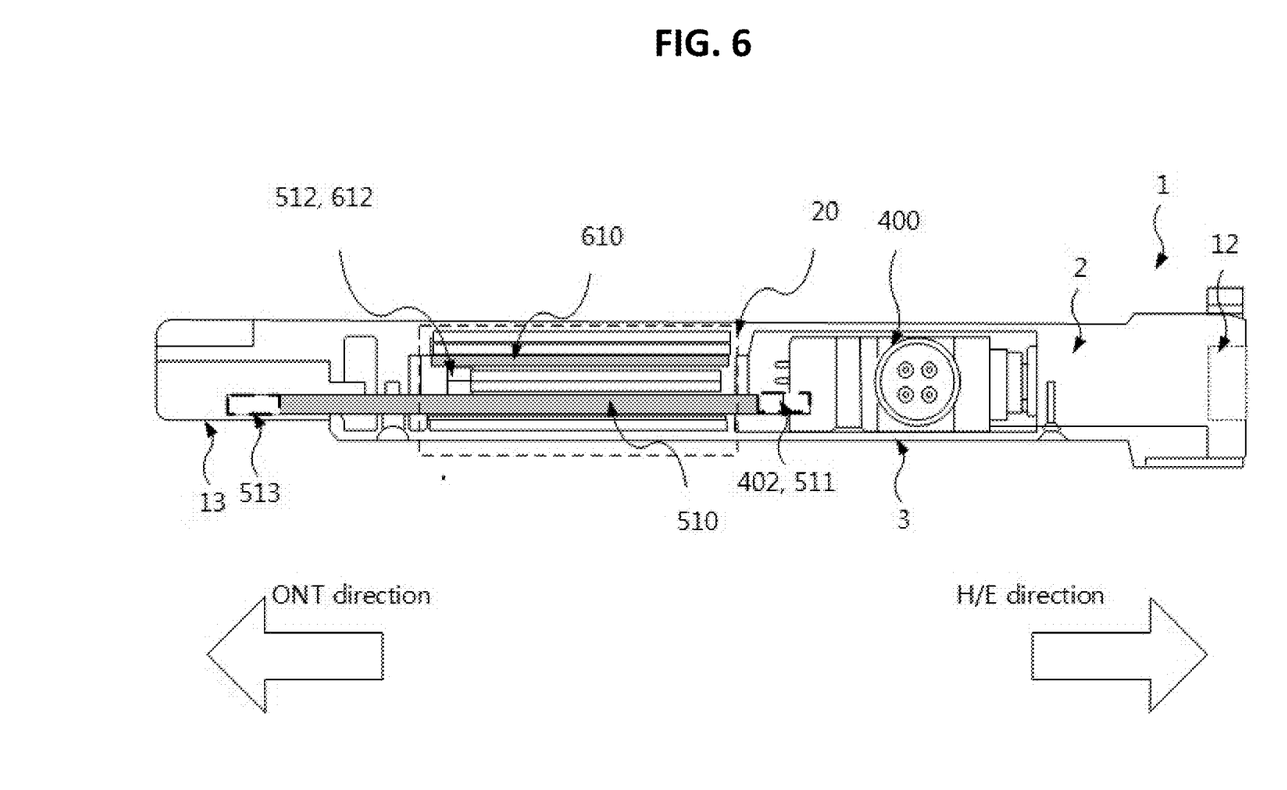
FIG. 6 is a cross-sectional diagram illustrating, in length direction A-A', a passive optical network-based video overlay pluggable type optical network device according to an embodiment of the present invention.

FIG. 4 is a perspective diagram illustrating a passive optical network-based video overlay pluggable type optical network device according to an embodiment of the present invention. FIG. 5 is an exploded perspective diagram illustrating a lower housing and an upper housing of a passive optical network-based video overlay pluggable type optical network device according to an embodiment of the present invention. FIG. 6 is a cross-sectional diagram illustrating, in length direction A-A', a passive optical network-based video overlay pluggable type optical network device according to an embodiment of the present invention. Hereinafter, description will be made with reference to FIGS. 4 to 6.

The triplexer optical sub-assembly 400, the PON board 510, and the RF board 610 are provided within an optical network housing 1 as shown in FIG. 4.

The optical network housing 1 includes a lower housing 2 and an upper housing 3.

The lower housing 2 includes: a bottom part 5; a front part 6 partially covering the upper and opposite side portions of the bottom part 5 in such a manner that the optical cable connector 401 connected to the optical splitter 250 is provided at one side end portion with respect to the length direction of the bottom part 5; and a first side part 7 and a second side part 8 extending vertically from the opposite sides with respect to the length direction and extending from the front part 6 with the upper portion thereof opened.

The front surface of the front part is provided with a connector insertion part 12 in such a manner as to expose the optical cable connector 410 to the outside.

In the space of the bottom part 5 at the rear side of the insertion part 12, a fixing member 4 including a triplexer fixing hole 11 through which the overlay optical transmission and reception unit 420 of the optical signal transmission and reception unit 400, namely, the triplexer optical sub-assembly 400 is inserted, is provided.

The first side part 7 and the second side part 8 are respectively provided with a first interference prevention hole 14-1 and a second interference prevention hole 14-2 that prevent the first side part 7 and the second side part 8 of the lower housing 2 from interfering with the PON optical reception unit 430 and the RF optical reception unit 450 of the triplexer optical sub-assembly 400.

The upper housing 3 covers the upper portion of the lower housing 2 after the front part 6 before an opened part 13.

To the opened part 13, the ONT connector 513 of the PON board 510 is exposed.

Referring to FIG. 6, as described above, the triplexer optical sub-assembly 400 is fixed into the triplexer fixing hole 11 of the lower housing 2 is placed in such a manner as to correspond to the first interference prevention hole 14-1 and the second interference prevention hole 14-2. The PON board 510 is connected to the first connector 402 of the triplexer optical sub-assembly 400 through the first connector 511 and is placed in the inner space of the lower housing in such a manner that the ONT connector 513 is placed in the opened part 13 of the lower housing 2.

The third connector 612 provided on the upper or lower portion of the RF board 610 is combined with the third connector 512 provided on the upper or lower portion of the PON board 510 so as to be placed in the inner space portion of the lower housing 2.

As described above, since the PON board 510 and the RF board 610 are provided in the optical network housing 1 having a relatively compact space therein, it is difficult to secure a space between the PON board 510 and the RF board 610. That is, since the PON board 510 and the RF board 610 are close to each other, the PON signals and the RF signals coexist in the narrow space. When these two types of signals coexist in the narrow space, crosstalk which is interference between signals causes a signal distortion problem.

In order to prevent this, a shielding part 20 is provided between the upper housing 3 and the PON board 510, between the PON board 510 and the RF board 610, and between the RF board 610 and the lower housing 2.

Configuration of the shielding part 20 will be described in detail with reference to FIG. 7.

With reference to FIGS. 4 to 6, the XFP pluggable type housing has been described, and without being limited thereto, various forms of pluggable products may be implemented.

Figure 7:
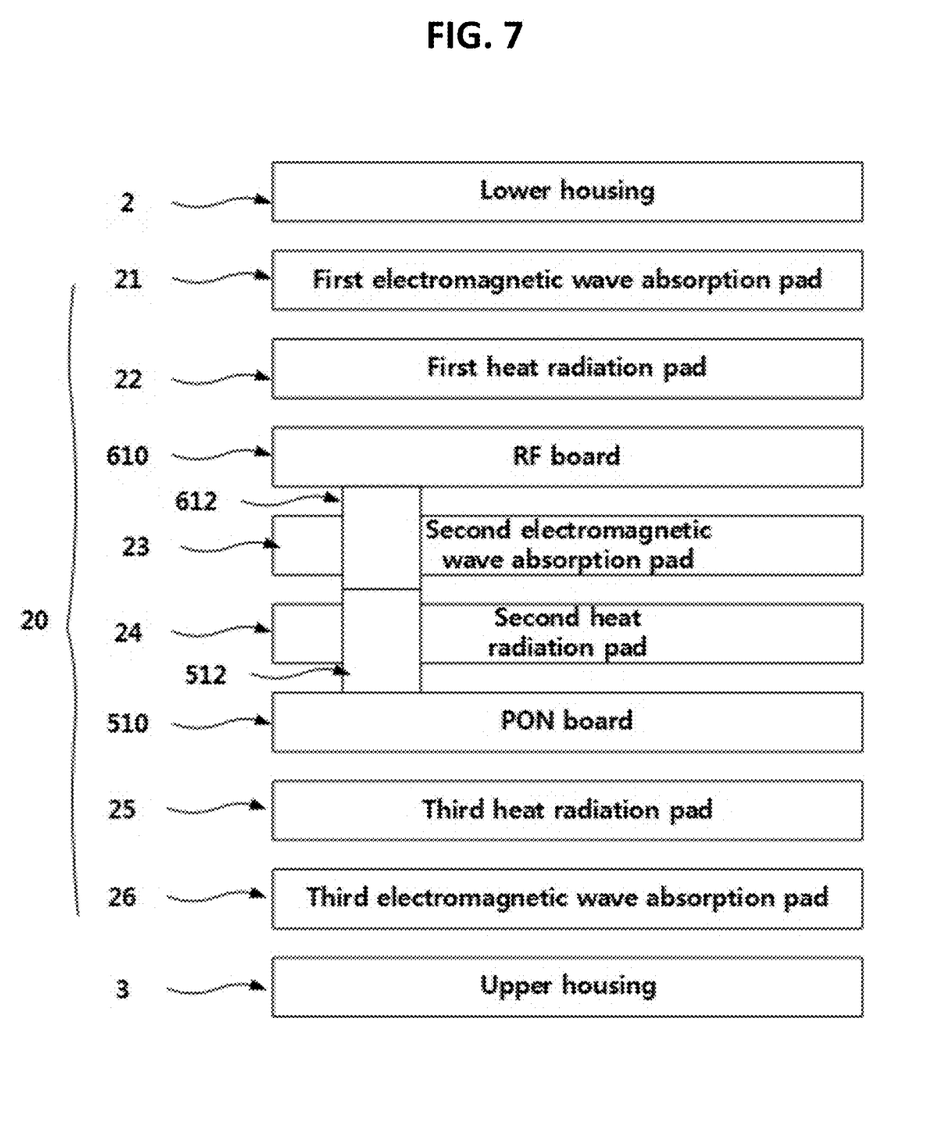
FIG. 7 is a diagram illustrating a shielding structure of a circuit part of a passive optical network-based video overlay pluggable type optical network device according to the present invention.

FIG. 7 is a diagram illustrating a shielding structure of a circuit part of a passive optical network-based video overlay pluggable type optical network device according to the present invention.

In FIG. 7, when describing a collective part in which the PON board 510 and the RF board 610 are configured, the term the circuit part is used.

The shielding part 20 includes: a first electromagnetic wave absorption pad 21 provided between the lower housing 2 and the RF board 610 to absorb electromagnetic waves generated from the RF board 610; a first heat radiation pad 22 provided between the first electromagnetic wave absorption pad 21 and the RF board 610 to radiate heat generated from the RF board 610; a second electromagnetic wave absorption pad 23 provided between the RF board 610 and the PON board 510 to absorb electromagnetic waves generated from the RF board 610 and the PON board 510; a second heat radiation pad 24 provided between the second electromagnetic wave absorption pad 23 and the PON board 510 to radiate heat generated from the PON board 510 and the RF board 610; a third electromagnetic wave absorption pad 26 provided between the PON board 510 and the upper housing 3 to absorb electromagnetic waves generated from the PON board 510; and a third heat radiation pad 25 provided between the third electromagnetic wave absorption pad 26 and the PON board 510 to radiate heat generated from the PON board 510.

By including the second electromagnetic wave absorption pad 23 between the PON board 510 and the RF board 610, the signals of the PON board 510 and the RF board 610 are prevented from being transmitted to the other side. That is, the optical network unit 300 of the present invention is capable of blocking interference between signals.

Also, the shielding part 20 includes the heat radiation pads between the lower housing 2 and the RF board 610, between the RF board 610 and the PON board 510, and between the PON board 510 and the upper housing 3 such that heat generated from the RF board 610 and the PON board 510 is effectively radiated.

Also, as shown in FIGS. 6 and 7, since the third connector 512 and the third connector 612 are provided on flat portions of the PON board 510 and the RF board 610 of the present invention, it is desirable that in order to enhance electromagnetic wave shielding and heat radiation efficiency, the second electromagnetic wave absorption pad 23 and the second heat radiation pad 24 are provided with holes corresponding to the shape of the third connector 612 and the third connector 512 and the third connector 512 is combined with the third connector 612 through the holes.

In the meantime, the present invention is not limited to the above-described exemplary embodiments, and it will be understood by those skilled in the art that various improvement, modifications, substitutions, and additions may be made without departing from the scope of the present invention. It is noted that if embodiments by such improvements, modifications, substitutions, and additions are within the scope of the following appended claims, the technical ideas thereof are also within the scope of the present invention.

What is claimed is:

1. A passive optical network (PON)-based video overlay pluggable type optical network device comprising:
   a triplexer optical sub-assembly including: an optical cable connector connected to an optical splitter; a first connector connected to a passive optical network processing unit; and a second connector connected to a video radio frequency processing unit, wherein when a detachable optical cable is inserted into the optical cable connector, the triplexer optical sub-assembly is connected to the optical splitter and receives a video overlay optical signal, separates a PON optical signal and an RF optical signal from the received video overlay optical signal and outputs the resulting PON optical signal through the first connector, outputs the resulting RF optical signal through the second connector, and transmits the PON optical signal input through the first connector to the optical splitter through the optical cable connector;
   an RF board, on which the video radio frequency processing unit is provided, including: a second connector connected to the second connector of the triplexer optical sub-assembly; and a third connector connected to the passive optical network processing unit, wherein an RF signal subjected to photoelectric conversion, which is input through the second connector of the RF board, is amplified by the video radio frequency processing unit and is output through the third connector, and the RF board is controlled by the passive optical network processing unit via the third connector;
   a PON board, on which the passive optical network processing unit is provided, including: a first connector connected to the first connector of the triplexer optical sub-assembly; a third connector connected to the third connector of the video radio frequency processing unit; and an optical network terminal (ONT) connector provided to be inserted and removed from an ONT, wherein the PON board transmits and receives the PON optical signal through the first connector of the triplexer optical sub-assembly, and is connected to the third connector of the RF board through the third connector of the PON board to receive the RF signal and to transmit a control signal, and the ONT connector transmits a PON signal and the RF signal to the ONT and receives the PON signal when being inserted into the ONT; and
   an electromagnetic wave shielding part provided between the RF board and the PON board and at an upper portion and a lower portion, the electromagnetic wave shielding part blocking interference between the RF signal and the PON signal and blocking electromagnetic waves from emission to outside.

2. The device of claim 1, wherein the triplexer optical sub-assembly comprises:
   an overlay optical transmission and reception unit provided with the optical cable connector to receive the video overlay optical signal and to transmit the PON optical signal;
   a PON optical transmission unit provided on a horizontal line with the overlay optical transmission and reception unit, the PON optical transmission unit receiving the PON optical signal to be transmitted through the first connector from the PON board;
   a PON optical reception unit provided to be perpendicular to the horizontal line, the PON optical reception unit outputting the PON optical signal included in the video overlay optical signal to the PON board through the first connector;
   an RF optical reception unit provided to be perpendicular to the horizontal line and to be in an opposite direction to the PON optical reception unit, the RF optical reception unit outputting the RF optical signal included in the video overlay optical signal; and
   an optical separation unit separating the PON optical signal from the video overlay optical signal received from the overlay optical transmission and reception unit and outputting the resulting PON optical signal to the PON optical reception unit, separating the RF optical signal from the video overlay optical signal and outputting the resulting RF optical signal to the RF optical reception unit in the opposite direction to the PON optical reception unit, and passing the PON optical signal input from the PON optical transmission unit to the overlay optical transmission and reception unit.

3. The device of claim 1, wherein the PON board is a board to which one among a gigabit Ethernet passive optical network (GE-PON), a gigabit passive optical network (G-PON), a 10 gigabit passive optical network (XG-PON), and a next-generation passive optical network (NG-PON) is applied, and
   the RF board is a board to which one among DOCSIS 3.0, DOCSIS 3.1, EU-CATV, and US CATV is applied.

4. The device of claim 1, wherein the ONT connector includes 30 pins,
   a sixth pin (Pin#6) is a power supply pin (VCC5),
   a 23-th pin (Pin#23) is an RF ground pin (RF_GND),
   a 24-th pin (Pin#24) is an RF output pin (RF_OUT), and
   a 25-th pin (Pin#25) is an RF ground pin (RF_GND).

5. The device of claim 1, wherein the electromagnetic wave shielding part comprises:
   a first electromagnetic wave absorption pad provided between a lower housing and the RF board to absorb electromagnetic waves;
   a second electromagnetic wave absorption pad provided between the RF board and the PON board to absorb electromagnetic waves; and
   a third electromagnetic wave absorption pad provided between the PON board and a bottom part of an upper housing to absorb electromagnetic waves.

6. The device of claim 5, wherein the electromagnetic wave shielding part further comprises:
   a first heat radiation pad provided between the RF board and the first electromagnetic wave absorption pad to radiate heat generated from the RF board;
   a second heat radiation pad provided between the second electromagnetic wave absorption pad and the PON board to radiate heat generated from the RF board and the PON board; and a third heat radiation pad provided between the PON board and the third electromagnetic wave absorption pad to radiate heat generated from the PON board.

7. The device of claim 6, wherein the third connector of the PON board and the third connector of the RF board, which are provided at upper portions of the respective boards, are directly connected to each other, and the second electromagnetic wave absorption pad and the second heat radiation pad are provided with connection holes corresponding to shapes of the third connectors at portions corresponding to the third connectors.

8. The device of claim 4, wherein the passive optical network processing unit of the PON board stores a memory map shown in Table 4 for communication with the RF board and control

TABLE 4

| Data Address | Field Size | Name of Field | Hex | Description of Field |
|---|---|---|---|---|
| A0h_Lower Memory Map | | | | |
| 10-11 | 2 | Analog RX Power High Alarm | 4D-F1 | 3 dBm |
| 12-13 | 2 | Analog RX Power Low Alarm | 03-E8 | −10 dBm |
| 14-15 | 2 | Analog RX Power High Warning | 3D-E9 | 2 dBm |
| 16-17 | 2 | Analog RX Power Low Warning | 04-E8 | −9 dBm |
| 50-51 | 2 | AUX 2 High Alarm | 3.00E-8.0 | 16 dBmV |
| 52-53 | 2 | AUX 2 Low Alarm | 2A-F8 | 11 dBmV |
| 54-55 | 2 | AUX 2 High Warning | 3A-98 | 15 dBmV |
| 56-57 | 2 | AUX 2 Low Warning | 2E-E0 | 12 dBmV |
| 98-99 | 2 | RF Power Monitor | | Unit: 1 dBuV |
| 108-109 | 2 | AUX2 Video RX Power | | Video RX Power value in units defined in MSA |
| 111 | 1 | General Control | | 0b: RF Video Off, 1b: RF Video On |
| Table 01h_Serial ID Data Field | | | | |
| 129 | 1 | Ext. Identifier | 90 | 3.5 W. w/CDR, W/o Refclk, w/o CLEI |
| 130 | 1 | Connector | 1 | SC Connector |
| 168-183 | 16 | Vender PN(ASCII code) | — | XFPELT-RSAS-A |
| 194-195 | | | 46-00 | 600 mA@3.3 V 200 mA@5.0 V(Optional) |
| 222 | 1 | Aux Monitoring | 76 | Aux1 for 3.3 V supply Voltage Aux2 for 5.0 V supply voltage(optional) |
| Table 70h_RF Table Fields | | | | |
| 128 | 1 | Reserved | | Reserved |
| 129 | 1 | RF Channel | — | 1~136(default: 136) |
| 130-179 | 50 | Reserved | | Reserved |
| 131 | 1 | AGC OFFSET | — | 8 bit signed two's complement |
| 132-255 | 124 | Reserved | | Reserved. |

* * * * *